O. Boldemann,

Disinfecting App's.

No 113,619.  Patented Apr. 11, 1891.

Witnesses:
A. Bennewendorf
Wm. H. C. Smith

Inventor:
O. Boldemann.

per Munn & Co.
Attorneys.

United States Patent Office.

OTTO BOLDEMANN, OF NEW YORK, N. Y.

Letters Patent No. 113,619, dated April 11, 1871.

IMPROVEMENT IN PERFUMING AND DISINFECTING APPARATUS.

The Schedule referred to in these Letters Patent and making part of the same.

*To all whom it may concern:*

Be it known that I, OTTO BOLDEMANN, of New York city, in the county and State of New York, have invented a new and improved Perfuming and Disinfecting Apparatus; and I do hereby declare that the following is a full, clear, and exact description thereof, which will enable others skilled in the art to make and use the same, reference being had to the accompanying drawing forming part of this specification.

This invention relates to improvements in evaporating, perfuming, disinfecting, or other fluids; and It consists in subjecting them to the action of a metallic platinum burner suspended in or above a vessel containing a quantity of alcohol or other liquid containing hydrogen, with which the perfuming disinfecting or other liquid to be evaporated is mixed.

Figure 1:
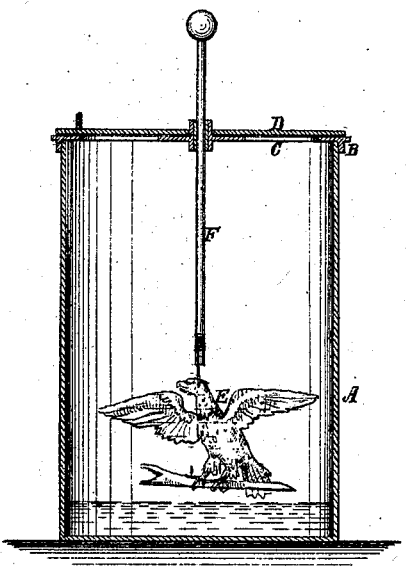
Figure 1 is a sectional elevation of one arrangement of apparatus which I use in carrying out my invention.
Figure 2:
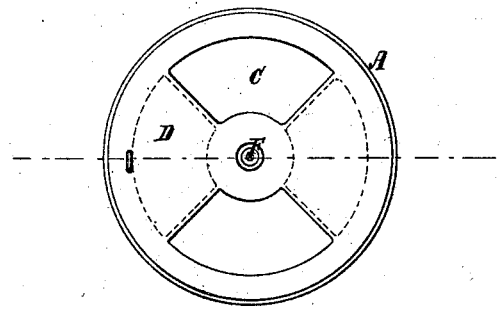
Figure 2 is a top view.

A is a small vessel, preferably a glass tumbler, with a removable cover, B, having one or more holes, C, through it, on which is a cover, D, also with holes, which may be adjusted by turning around the vertical axis so as to open or close the holes C.

E is the metallic platinum burner, which, for the sake of a beautiful appearance when illuminated, I make an outline in the shape of any beautiful form, as a bird, animal, or the like; it is suspended by a wire, or in any other way, from a rod, F, extending from above the cover to a suitable point below, as shown; or it may be suspended altogether above the vessel, in which case a low vessel will be used for holding the liquid and the burner will be in a globe above.

The alcohol or other liquid, together with the perfume or disinfectant substance—say, carbolic acid—are placed in the vessel, the burner is then heated in a gas or other flame and placed in the vessel, as shown. Whereupon the hydrogen contained in the liquid is condensed on the surface of the platinum, combining with the oxygen of the air, forming water, and evaporating immediately, the intensity of the combination of the two gases keeping the platinum red hot, so that an illuminated figure of any kind represented by the outline of the burner may be seen through the glass, thereby making an apparatus, which, besides being useful, may be a pleasing toy.

The cover is turned so as to close the holes C after the heated burner is put in until sufficient heat is obtained; it is then opened and the product of the combustion allowed to escape.

I prefer to employ a double valve—that is, one with two holes—by which the circulation of the air in the vessel is facilitated and the combustion increased.

Having thus described my invention,

I claim as new and desire to secure by Letters Patent—

The improved mode of evaporating perfuming, disinfecting, or other liquids by means of a metallic platinum burner, suspended in or above a vessel containing the liquid mixed with alcohol or other liquid containing hydrogen, substantially as specified.

The above specification of my invention signed by me this 15th day of February, 1871.

OTTO BOLDEMANN.

Witnesses:
GEO. W. MABEE,
ALEX. F. ROBERTS.